(12) United States Patent
Long

(10) Patent No.: US 7,485,331 B2
(45) Date of Patent: Feb. 3, 2009

(54) TENDERIZATION OF MEAT

(75) Inventor: John B. Long, Sarasota, FL (US)

(73) Assignee: Hydrodyne Incorporated, Hato Rey, PR (US)

( * ) Notice: Subject to any disclaimer, the term of this patent is extended or adjusted under 35 U.S.C. 154(b) by 716 days.

(21) Appl. No.: 10/502,745

(22) PCT Filed: Jan. 29, 2003

(86) PCT No.: PCT/US03/02514

§ 371 (c)(1), (2), (4) Date: Apr. 29, 2005

(87) PCT Pub. No.: WO03/063618

PCT Pub. Date: Aug. 7, 2003

(65) Prior Publication Data

US 2005/0191401 A1    Sep. 1, 2005

Related U.S. Application Data

(60) Provisional application No. 60/352,207, filed on Jan. 29, 2002.

(51) Int. Cl.
*A23L 1/318* (2006.01)
*A23L 3/015* (2006.01)
*A23L 3/30* (2006.01)

(52) U.S. Cl. .................. 426/238; 426/281; 426/641

(58) Field of Classification Search ................ 426/234, 426/238, 281, 641
See application file for complete search history.

(56) References Cited

U.S. PATENT DOCUMENTS

| | | |
|---|---|---|
| 5,273,766 A | 12/1993 | Long |
| 5,328,403 A | 7/1994 | Long |
| 6,120,818 A | 9/2000 | Long |
| 6,168,814 B1 | 1/2001 | Long |
| 6,200,615 B1 | 3/2001 | Long |
| 6,206,773 B1 | 3/2001 | Waits |
| 6,224,476 B1 | 5/2001 | Long et al. |
| 6,306,029 B1 | 10/2001 | Long |

*Primary Examiner*—Arthur L Corbin
(74) *Attorney, Agent, or Firm*—Browdy and Neimark, P.L.L.C.

(57) ABSTRACT

Meat such as beef or pork is tenderized by first subjecting it to Hydrodyne treatment, followed by injecting the meat with an aqueous marinade. In this way, the quantity of marinade which is retained in the meat without purge can be increased by 40% to a marinade content of about 14%.

20 Claims, No Drawings

TENDERIZATION OF MEAT

FIELD OF INVENTION

The present invention relates to the improved retention of liquids in meat for improved tenderization. This application is based on U.S. provisional application 60/352,207, filed Jan. 29, 2002, the contents of which are hereby incorporated by reference.

BACKGROUND

One known system for tenderizing tough cuts of meat is to inject the meat with marinade. Upon such injection, the meat becomes somewhat more tender and palatable. Up to the present time, it has been possible to get top and bottom sirloin, for example, to hold about 10% of its original weight in marinade. Prior attempts to inject more than 10% by weight results in the liquid exuding from the meat, which is called "purge" in the meat industry.

According to the Hydrodyne system (noting U.S. Pat. Nos. 5,273,766; 5,328,403; 6,120,818; 6,168,814; 6,200,615; 6,206,773; 6,224,476; and 6,306,029, as well as application Ser. No. 10/005,763), meat is tenderized by subjecting the meat to an acoustive or pressure pulse or wave. A shock wave travels outwardly from the explosion site at the speed of sound, or somewhat higher in the case of high-intensity shock waves. Such shock waves or shock pulses, and even more so refraction or negative compression waves which pass through the meat after the initial shock wave in at least some of the Hydrodyne embodiments, have the effect of rupturing the myofibular or other tissues encapsulating meat fibers within the meat which cause toughness, thereby significantly improving the tenderization of the meat.

The need for tenderizing tough cuts of meat has always existed, but in recent years has become more important due to the increasing awareness among the public that normally tender cuts of meat, particularly "prime" and "choice" grades, which contain more fat, are potentially unhealthy, as consumption of large amounts of animal fat can lead to increased "bad" blood cholesterol levels and eventual heart disease.

The art is therefore in need of ways to improve the tenderization of tougher grades of meat which contain less fat than "prime" and "choice" grades, namely those cuts of meat which contain little fat, are initially tough, and which have grades which are lower than "choice", e.g. the "select" grade.

SUMMARY OF INVENTION

According to the present invention, tough grades of meat, particularly of beef and pork, but other types of meat as well, e.g. lamb, mutton, poultry, etc., are first subject to Hydrodyne treatment according to embodiments as disclosed in the aforementioned patents and application, all of which are respectfully incorporated by reference. After Hydrodyne treatment, the meat is then infused or impregnated with marinade, or even with plain water. By first treating the meat by the Hydrodyne process, it is surprisingly found that the meat will hold approximately 40% more marinade than if the meat has not been previously treated according to the Hydrodyne process.

DETAILED DESCRIPTION OF EMBODIMENTS

Those skilled in the art know of the impregnation of marinade into meat. The type of marinade used may be selected from among those known, including pickling solutions, brine, corning solution used in the manufacture of corned beef, etc. Normally, the marinade will comprise over 99% water, as well phosphate salt and a tenderizing component which will not attack the meat fibers itself; typical marinades for injection may contain an acid, e.g. citric acid, sugar and/or spices.

As indicated above, it has been found that top and bottom sirloin, for example, can hold only about 10% by weight of the marinade based on the initial weight of the meat. However, subjecting the meat first to the Hydrodyne process enables the top and bottom sirloin to retain an additional 40% by weight of the marinade, based on the 10% previously retainable; in other words, the present invention enables the top and bottom sirloin to retain approximately 14% by weight of marinade based on the weight of the meat.

In accordance with the present invention, the meat selected to be treated, e.g. "select" grade, is first subjected to the Hydrodyne process. The shock waves result in breakage of tissues that separate bundles of muscle fibers. Where the tissues become separated, small voids are produced in the meat. It is theorized that these voids are sufficiently small so that they are able to retain within the meat the marinade liquids by capillary action. Consequently, after packaging, the meat will not exude substantial quantities of liquid, commonly known as "purge" in the meat industry.

The marinade is preferably injected into the meat such as by using injection needles, well known in the art. Alternatively and less preferred, the meat may be simply soaked in the marinade.

After impregnation of the marinade into the meat, it is processed in the usual way, e.g. by packaging the meat in plastic bags and forwarding the packaged meat directly to retailers.

While it is stated above that preliminary treatment according to the Hydrodyne process provides an average increase of 40% of the quantity of marinade which is retained in the meat without purge, it will be understood that this is an average, and that sometimes the increase is more than 40% and sometimes it is less than 40%. Usually, the amount of marinade retained in for example "select" grade top and bottom sirloin following Hydrodyne treatment and then marinade injection will range from about 13.5% to about 14.5%.

The invention claimed is:

1. A method of increasing liquid content in meat without substantial purge of said liquid from said meat, comprising
   subjecting said meat to a shock wave to effect tenderization of said meat, and
   thereafter injecting said liquid into said meat.

2. The method of claim 1, wherein said liquid is a marinade comprising at least one of sugar, acid and spices.

3. The method of claim 2, wherein said marinade is injected into said meat with needles.

4. The method of claim 3, wherein said marinade is injected into said meat immediately after said tenderization.

5. The method of claim 4, wherein the amount of marinade retained in the meat is about 13.5% to about 14.5% based on the weight of the meat.

6. The method of claim 1, wherein said liquid is injected into said meat with needles.

7. The method of claim 1, wherein said liquid is injected into said meat immediately after said tenderization.

8. The method of claim 1, wherein the amount of marinade retained in the meat is about 13.5% to about 14.5% based on the weight of the meat.

9. A method of tenderizing meat comprising first subjecting said meat to a shock wave, and then injecting into said meat a liquid comprising an aqueous marinade.

10. The method of claim 9, wherein the marinade comprises at least one of sugar, acid and spices.

11. The method of claim 10, wherein the marinade is injected by needle injection.

12. The method of claim 11, wherein said injection of marinade is carried out immediately after subjecting said meat to said shock wave.

13. The method of claim 12, wherein the amount of marinade retained in the meat is about 13.5% to about 14.5% based on the weight of the meat.

14. The method of claim 10, wherein said injection of marinade is carried out immediately after subjecting said meat to said shock wave.

15. The method of claim 14, wherein the amount of marinade retained in the meat is about 13.5% to about 14.5% based on the weight of the meat.

16. The method of claim 9, wherein the marinade is injected by needle injection.

17. The method of claim 16, wherein said injection of marinade is carried out immediately after subjecting said meat to said shock wave.

18. The method of claim 17, wherein the amount of marinade retained in the meat is about 13.5% to about 14.5% based on the weight of the meat.

19. The method of claim 9, wherein said injection of marinade is carried out immediately after subjecting said meat to said shock wave.

20. The method of claim 9, wherein the amount of marinade retained in the meat is about 13.5% to about 14.5% based on the weight of the meat.

* * * * *